United States Patent
Abdelmalek et al.

(10) Patent No.: US 12,207,318 B2
(45) Date of Patent: Jan. 21, 2025

(54) METHOD AND SYSTEM FOR INTER-OPERATOR MOBILITY SERVICE

(71) Applicant: Verizon Patent and Licensing Inc., Basking Ridge, NJ (US)

(72) Inventors: Yousef Abdelmalek, New Providence, NJ (US); Miguel A. Carames, Long Valley, NJ (US); Sudhakar Reddy Patil, Flower Mound, TX (US); Matthew W. Nelson, Pleasanton, CA (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 611 days.

(21) Appl. No.: 17/501,235

(22) Filed: Oct. 14, 2021

(65) Prior Publication Data
US 2023/0119045 A1   Apr. 20, 2023

(51) Int. Cl.
*H04W 24/10* (2009.01)
*H04W 76/10* (2018.01)

(52) U.S. Cl.
CPC ........... *H04W 76/10* (2018.02); *H04W 24/10* (2013.01)

(58) Field of Classification Search
CPC ..... H04W 76/10; H04W 24/10; H04W 48/18; H04W 88/085; H04W 76/12
See application file for complete search history.

(56) References Cited

U.S. PATENT DOCUMENTS

2016/0337914 A1* 11/2016 Hoffmann ......... H04W 36/0083

* cited by examiner

*Primary Examiner* — Chuong A Ngo

(57) ABSTRACT

A method, a device, and a non-transitory storage medium are described in which an inter-operator mobility service is provided. The service may provide provisioning decisions and configurations that may include core devices that are shared between users of a first entity and users of a second entity, or are dedicated to the users of the second entity to support a network slice and/or access to an application service for end devices associated with the second entity. The service may manage access and use of radio frequencies associated with the first and second entities based on subscription information and location of the end devices associated with first and second entities. The service may further include enabling inter-network handovers associated with end devices associated with end devices associated with the second entity.

20 Claims, 15 Drawing Sheets

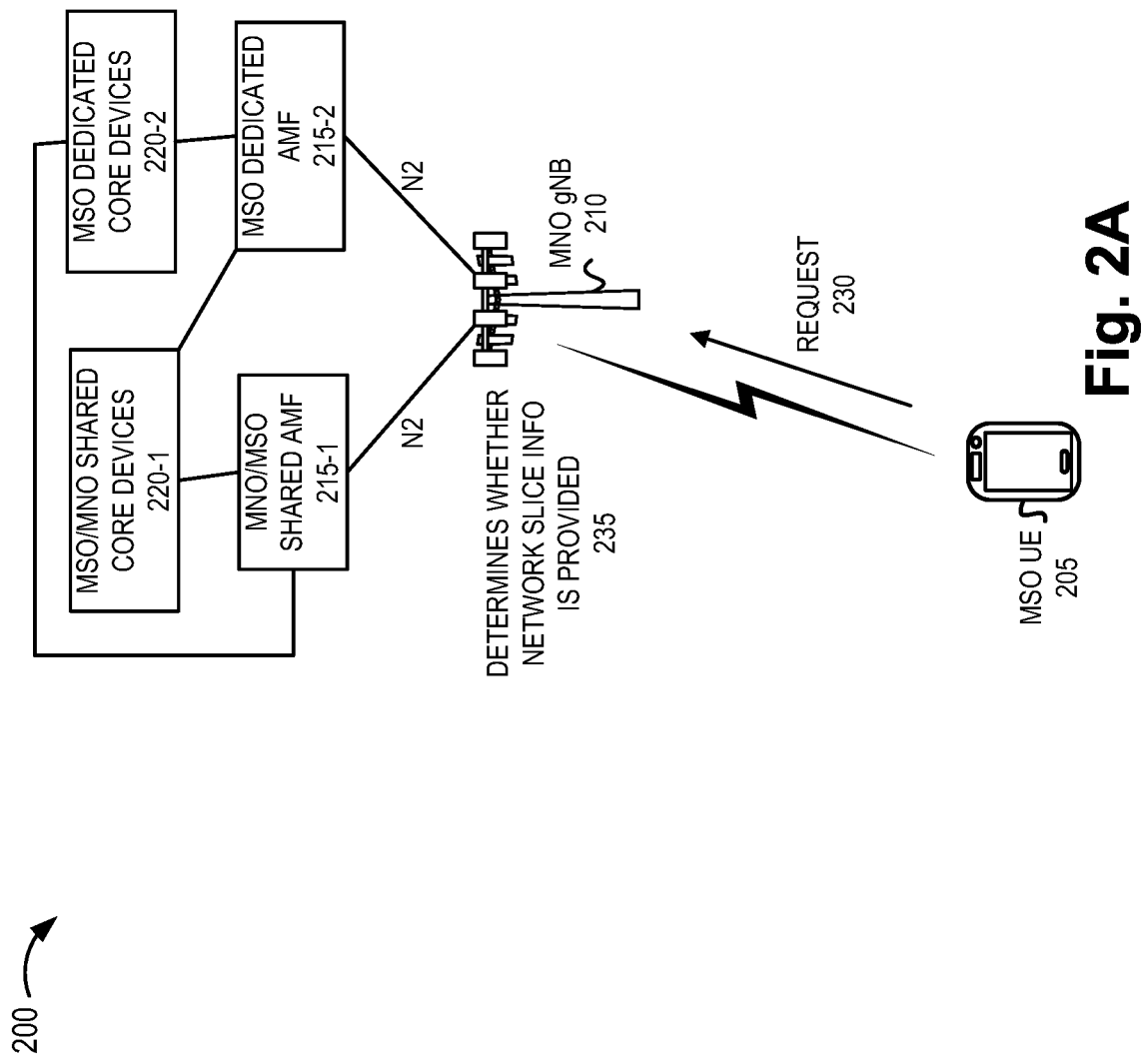

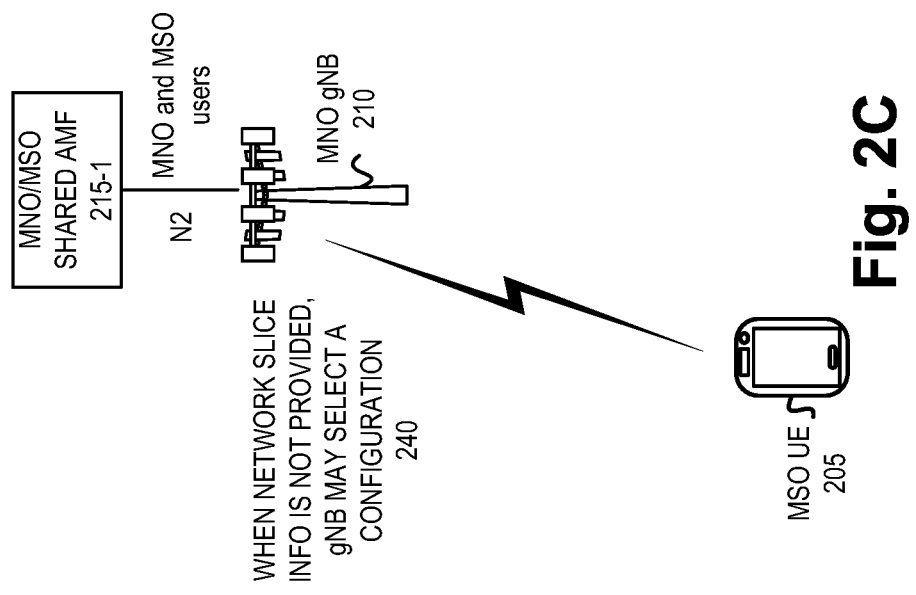

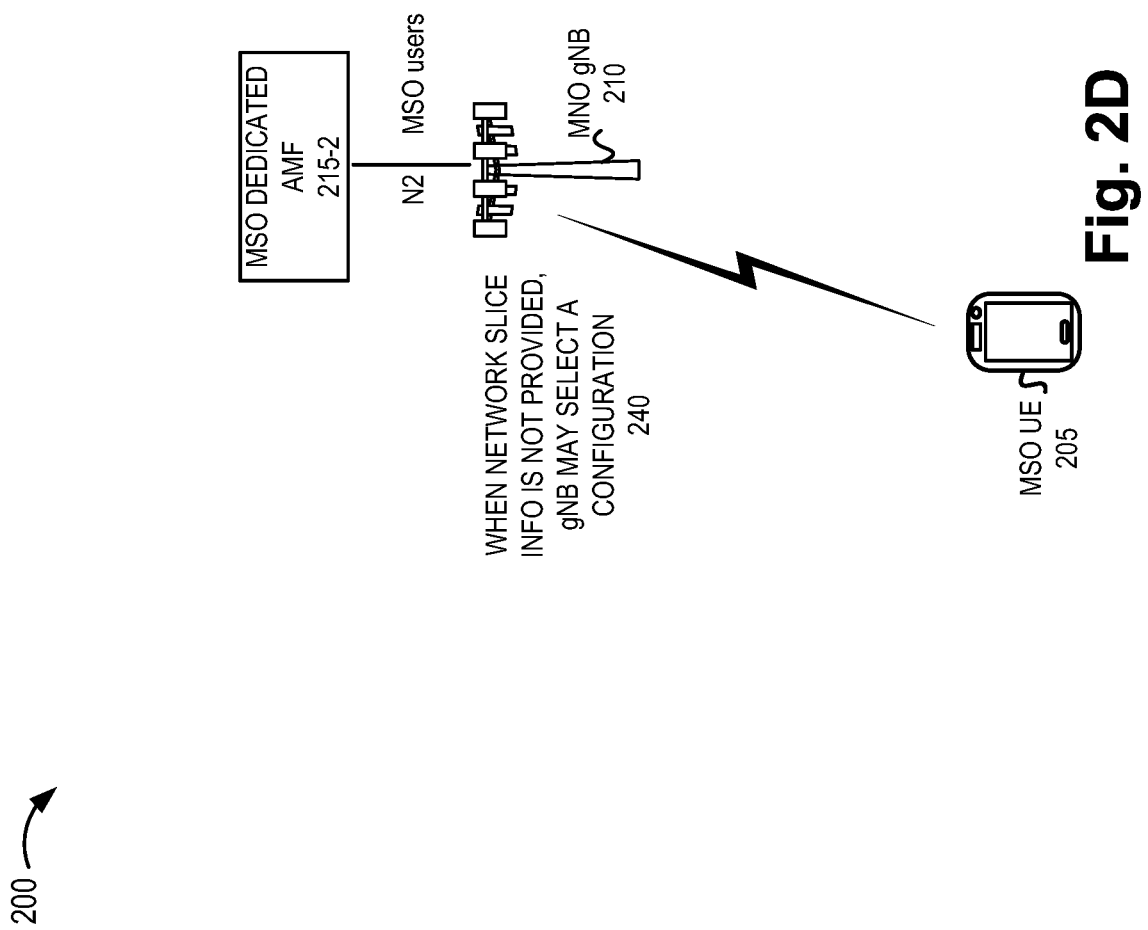

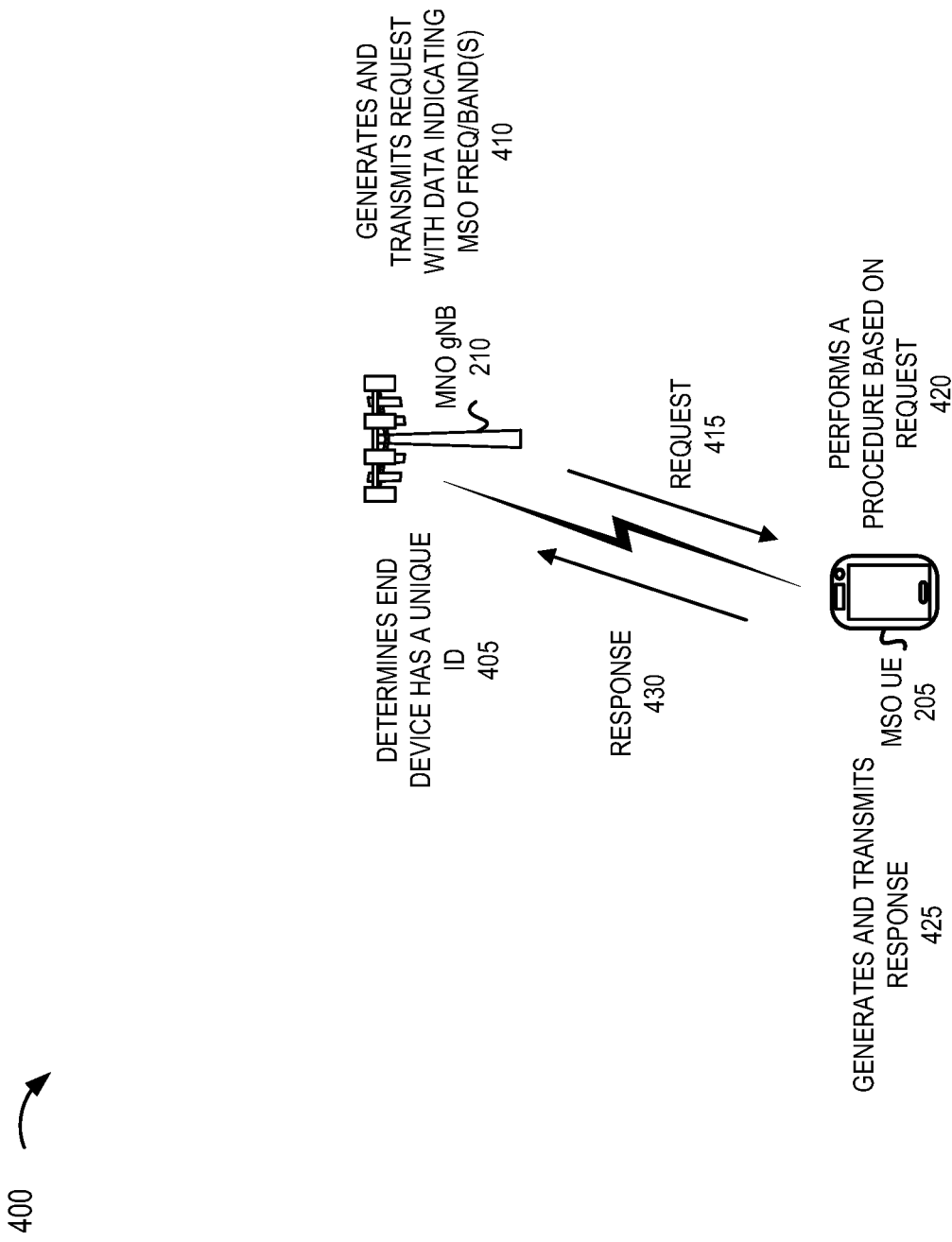

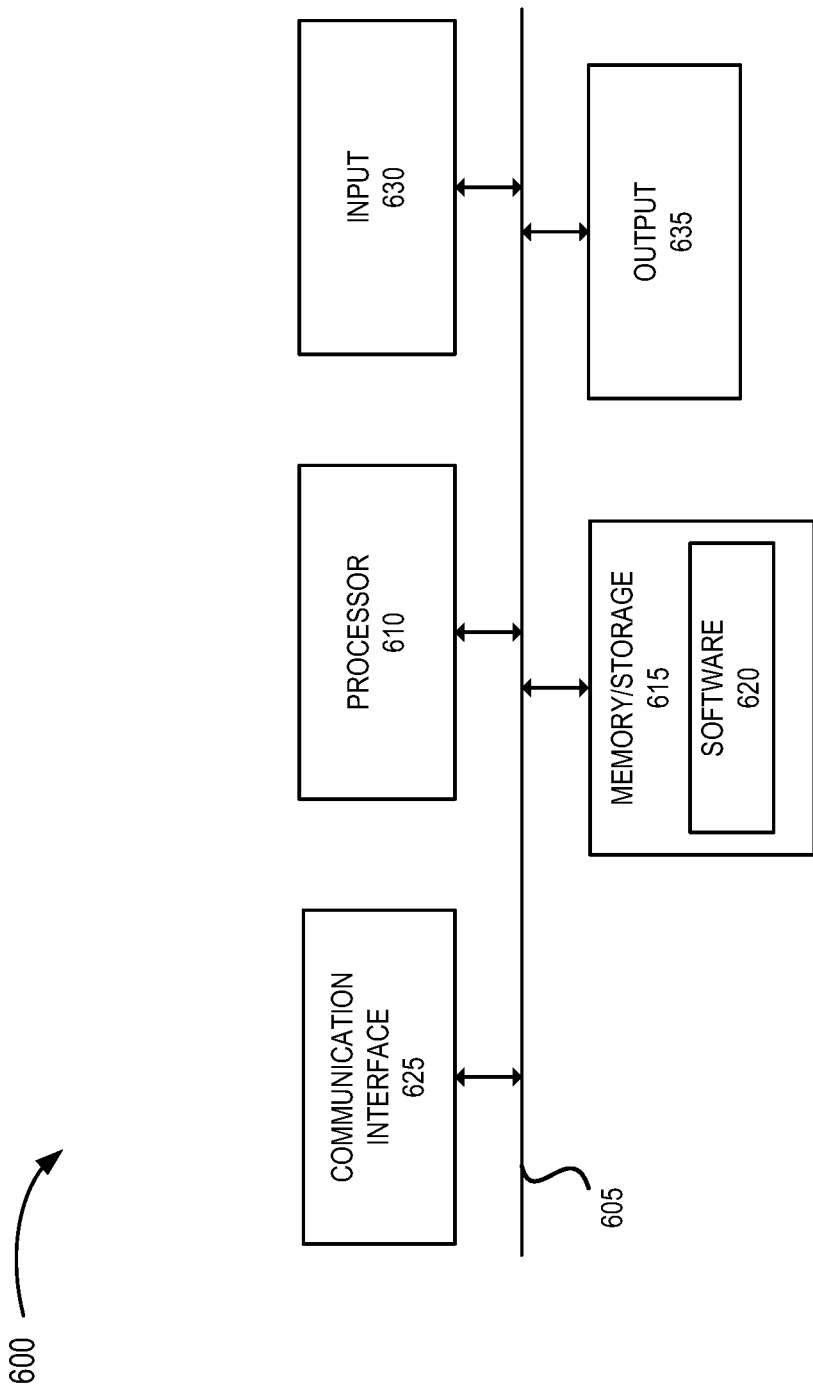

METHOD AND SYSTEM FOR INTER-OPERATOR MOBILITY SERVICE

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIGS. 2A-2E are diagrams illustrating an exemplary process of an exemplary embodiment of the inter-operator mobility service;

FIGS. 4A and 4B are diagrams illustrating yet other exemplary processes of exemplary embodiments of the inter-operator mobility service;

FIG. 6 is a diagram illustrating exemplary components of a device that may correspond to one or more of the devices illustrated and described herein;

DETAILED DESCRIPTION

Figure 1:
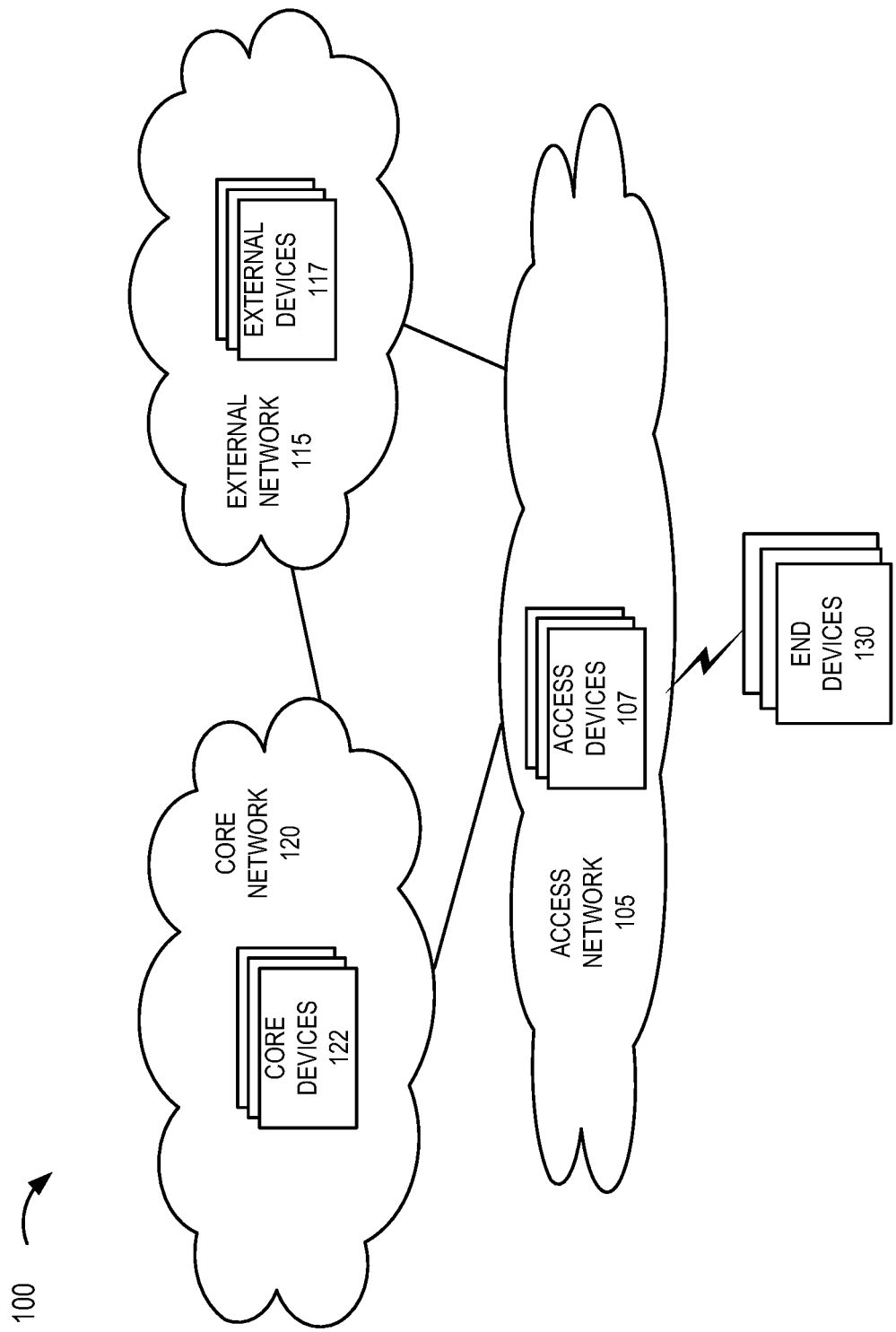
FIG. 1 is a diagram illustrating an exemplary environment in which an exemplary embodiment of an inter-operator mobility service may be implemented.

The following detailed description refers to the accompanying drawings. The same reference numbers in different drawings may identify the same or similar elements. Also, the following detailed description does not limit the invention.

A first entity, such as a mobile service operator (MSO), may partner with a second entity, such as a mobile network operator (MNO), to provide a wireless service and/or an application service to end users of the MSO. There are multiple approaches to roaming models, such as home routed (HR) and local break out (LBO) that support inter-operator mobility between the first entity and the second entity, for example. However, these approaches do not address deployment and managerial aspects for scenarios that may involve network slicing or regional restrictions, or where a unified access and/or admission control is desired for users of different entities.

According to exemplary embodiments, an inter-operator mobility service is described. According to an exemplary embodiment, the inter-operator mobility service may be implemented according to various Fifth Generation (5G) stand-alone (SA) architectures that may support network slicing, as described herein. For example, the various 5G SA architectures may include shared core devices between an MNO and an MSO and dedicated core devices of an MSO, only shared core devices between the MNO and the MSO, or only dedicated core devices of the MSO, as described herein.

According to an exemplary embodiment, the inter-operator mobility service may include a core device that may manage access control for end devices of either an MNO or an MSO. The core device may make determinations of access for end devices based on their subscription information. The subscription information may include tracking area information or tracking area information and restriction information, as described. According to an exemplary embodiment, the core device may be implemented as a mobility management entity (MME) or an access and mobility management function (AMF).

According to an exemplary embodiment, the inter-operator mobility service may include the assignment and use of a unique subscriber profile identifiers (SPIDs) for MSO subscribers of an MNO. A radio access network (RAN) device of the MNO RAN may request that an end device of the MSO scan and measure frequencies or frequency bands of the MSO. According to an exemplary embodiment, end devices of an MNO, which may not be assigned the unique SPID, may not be allowed to scan and measure frequencies or frequency bands of the MSO.

In view of the foregoing, the inter-operator mobility service may provide efficient network resources to end devices of an MSO. Additionally, the inter-operator mobility service may provide efficient use of network resources pertaining to an MNO and an MSO, and afford admission control (e.g., prioritize, limit, etc.) regarding incoming traffic when a criterion is satisfied, as described herein. The inter-operator mobility service may manage MSO end devices use of MSO and MNO RAN devices, as well as manage MNO end devices use of MSO RAN devices. For example, end devices of the MNO may or may not be able to use the RAN devices of the MSO. Additionally, the inter-operator mobility service may improve power consumption of end devices. For example, the inter-operability mobility service may manage the frequencies or frequency bands that end devices of an MSO may scan and measure (e.g., including MNO frequencies or frequency bands) while end devices of the MNO may not be permitted to scan and measure frequencies or frequency bands of the MSO. In this regard, end devices of an MNO may not attach to RAN devices of the MSO.

FIG. 1 is a diagram illustrating an exemplary environment 100 in which an exemplary embodiment of inter-operator mobility service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the inter-operator mobility service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), Global System Mobile Association (GSMA), and the like) or a new interface of the network device may be provided in order to support the communication (e.g., transmission and reception of messages, information elements (IE), attribute value pairs (AVPs), objects, parameters, or another form of a data instance) between network devices and the inter-operator mobility service logic of a network device and/or an end device, as described herein. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may include an MNO access network and an MSO access network that each includes logic that provides an exemplary embodiment of the inter-operator mobility service, as described herein.

Access network 105 may include different and multiple functional splitting, such as options 1, 2, 3, 4, 5, 6, 7, or 8 that relate to combinations of access network 105 and core network 120 including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

According to some exemplary embodiments, access network 105 may be implemented to include various architectures of wireless service, such as, for example, 5G, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, carrier frequencies, and segments of radio spectrum (e.g., cm wave, mm wave, below 6 gigahertz (GHz), above 6 GHz, higher than mm wave, C-band, licensed radio spectrum, unlicensed radio spectrum), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to an exemplary embodiment, access devices 107 may include MNO access devices and MSO access devices that each includes logic that provides an exemplary embodiment of the inter-operator mobility service, as described herein.

External network 115 may include one or multiple networks of one or multiple types and technologies. For example, external network 115 may be implemented to include a service or an application layer network, a cloud network, a private network, a public network, a MEC network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application service.

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network. According to an exemplary embodiment, core network 120 may include an MNO core network and an MSO core network that each includes logic that provides an exemplary embodiment of the inter-operator mobility service, as described herein.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an AMF, a session management function (SMF), a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a MME, a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to an exemplary embodiment, core devices 122 may include MNO core devices and MSO core devices that each includes logic that provides an exemplary embodiment of the inter-operator mobility service, as described herein.

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients. End device 130 is not to be considered a network device, as described herein. According to an exemplary embodiment, end devices 130 may include MNO end devices and MSO end devices that each includes logic that provides an exemplary embodiment of the inter-operator mobility service, as described herein.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

According to an exemplary embodiment, at least a portion of access devices 107 may include inter-operator mobility service logic and an interface that supports the inter-operator mobility service, as described herein. According to an exemplary embodiment, network devices of other types of networks (e.g., core network 120, external network 115, an X-haul network, or another type of network) may include inter-operator mobility service logic and an interface that supports the inter-operator mobility service, as described herein.

Figure 2B:
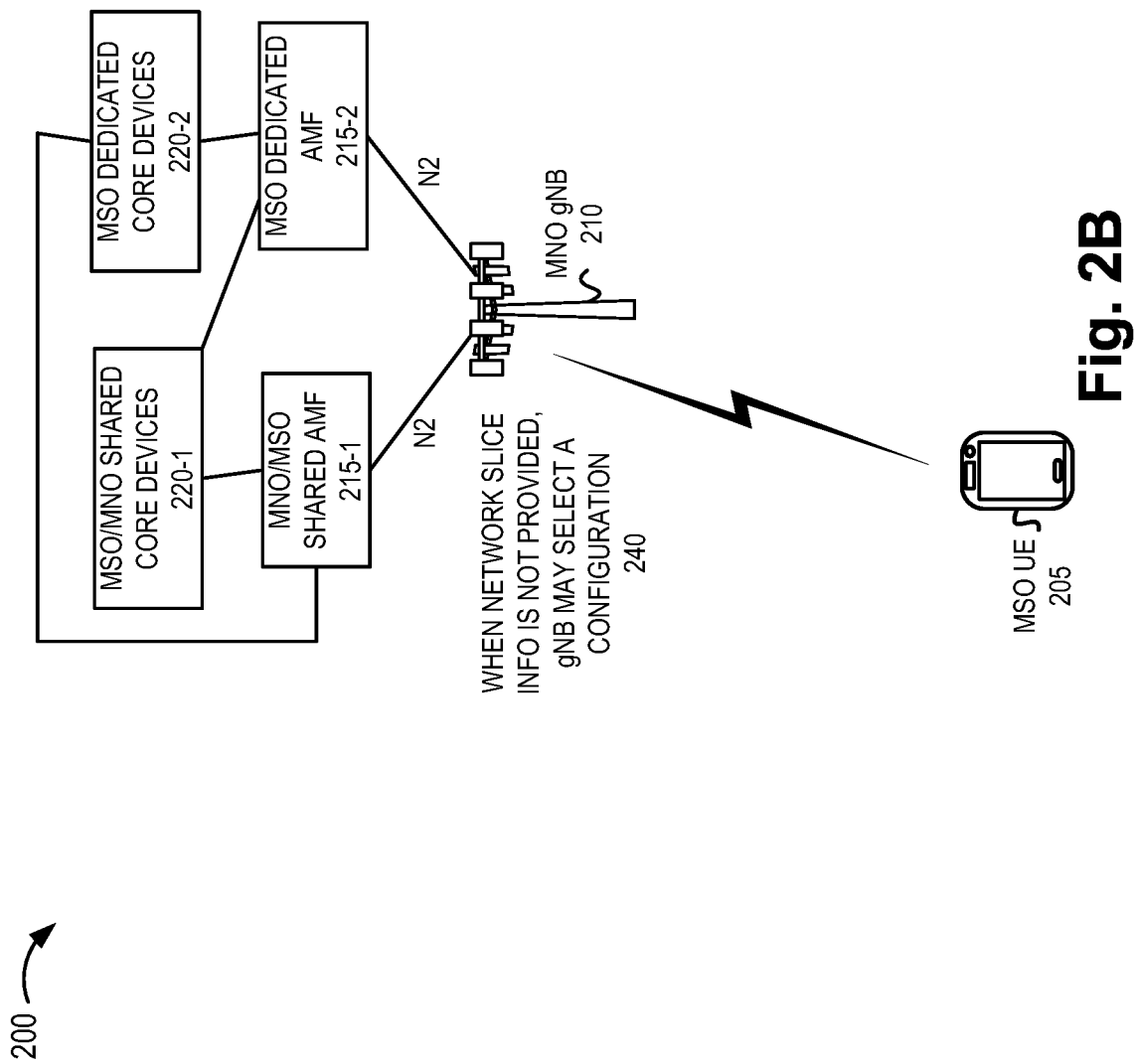

FIGS. 2A-2E are diagrams illustrating an exemplary process 200 of an exemplary embodiment of the inter-operator mobility service. Referring to FIG. 2A, process 200 may be implemented in an exemplary environment that includes an MSO UE 205, an MNO gNB 210, an MNO/MSO shared AMF 215-1, an MSO dedicated AMF 215-2, MSO/MNO shared core devices 220-1, and MSO dedicated core devices 220-2. MSO UE 205 may be an implementation of end device 130. MSO UE 205 may be operated by or associated with an MSO. MNO gNB 210 may be an implementation of access device 107 of access network 105 (e.g., MNO access network). MNO gNB 210 may be associated with an MNO. MNO/MSO shared AMF 215-1 may be implemented as core device 122 of core network 120 (e.g., an MNO core network). MNO/MSO shared AMF 215-1 may include an AMF that is shared between users of the MSO and the MNO. MSO dedicated AMF 215-2 may be implemented as core device 122 of the MNO core network. MSO dedicated AMF 215-2 may include an AMF that is dedicated to users of the MSO.

The number, the type, and the arrangement of network devices illustrated in FIGS. 2A-2E are exemplary. According to other exemplary implementations, there may be different types, number of, and/or arrangement of network devices than those illustrated and described herein in relation to process 200. Additionally, the number and type of connections illustrated in FIGS. 2A-2E are exemplary. For example, according to other exemplary embodiments, MNO gNB 210 may include an N2 interface to either MNO/MSO shared AMF 215-1 or MSO dedicated AMF 215-2—but not both. Additionally, although not illustrated, the environment may include an MNO dedicated AMF. MNO gNB 210 may include an N2 interface to the MNO dedicated AMF. The MNO dedicated AMF may be implemented as core device 122 of the MNO core network and may include an AMF that is dedicated to users of the MNO.

As illustrated, MSO UE 205 may generate and transmit a request 230 to MNO gNB 210. For example, request 230 include a packet data unit (PDU) session establishment request. According to other examples, request 230 may include an attach request. According to various exemplary scenarios, request 230 may or may not include network slice information. For example, the network slice information may include single network slice selection assistance information (S-NSSAI) or a portion thereof, such as a slice/service type (SST) value or another type of network slice identifier or value that may identify or indicate a network slice.

In response to receiving request 230, MNO gNB 210 may determine whether network slice information is provided 235. For example, MNO gNB 210 may read the data of request 230. Referring to FIG. 2B, when MNO gNB 210 determines that request 230 does not include the network slice information, MNO gNB 210 may select a default configuration 240. For example, the default configuration may include the selection of an AMF. For example, referring to FIG. 2C, the default configuration may be implemented as selecting MNO/MSO shared AMF 215-1 as the AMF. As illustrated, MNO/MSO shared AMF 215-1 and the N2 interface and communication link may support both MNO and MSO users (i.e., shared). According to another example, referring to FIG. 2D, the default configuration may be implemented as selecting MSO dedicated AMF 215-2 as the AMF. As illustrated, MSO dedicated AMF 215 and the N2 interface and communication link may support only MSO users (i.e., dedicated).

Referring back to FIG. 2B, according to some exemplary embodiments of the inter-operator mobility service, MNO gNB 210 may have a binary choice to select between MNO/MSO shared AMF 215-1 and MSO dedicated AMF 215-2 when request 230 does not include network slice information. According to some exemplary embodiments, MNO gNB 210 may make the selection based on one or multiple criteria. For example, request 230 may include requested PDU session type information that may indicate if the PDU session is a new PDU session, an existing PDU session (e.g., associated with a handover from another network), or an emergency request (e.g., for emergency services). According to some exemplary scenarios, the handover may relate to a handover from an MSO network of the MSO. According to another example, request 230 may include a data network name (DNN), which may identify a data network, and/or an application service identifier that may identify an application service. According to still other examples, MNO gNB 210 may determine the location of MSO UE 205 and/or the frequency/frequency band used by MSO UE 205. MNO gNB 210 may determine or infer a quality of service (QoS), a 5G QoS Class Identifier (QCI), and/or a performance metric (e.g., throughput, bitrate, latency, etc.) based on the frequency/frequency band used by MSO UE 205 and/or other criteria described. MNO gNB 210 may select the AMF based on or more of these factors to support a default network slice pertaining to request 230 and MSO UE 205.

As further illustrated in FIGS. 2A and 2B, for example, additional MNO core devices of the MNO core network may be selected to support the default network slice, such as MSO/MNO shared core devices 220-1 or MSO dedicated core devices 220-2. For example, the additional MNO core devices may include an SMF, a PGW, a UPF, a CHF, an AUSF, an NSSF, an HSS, a UDM, and/or other type of core devices, as described herein. The default network slice may support access to an application service for MSO UE 205. For example, the default network slice may be provisioned to provide access to the application service hosted in external network 115.

According to various embodiments, the inter-operator mobility service may pair MNO/MSO shared AMF 215-1 with MSO/MNO shared core devices 220-1 or MSO dedicated core devices 220-2, and similarly MSO dedicated AMF 215-2 may be paired with MSO/MNO shared core devices 220-1 or MSO dedicated core devices 220-2. For example, an MSO/MNO shared SMF (e.g., of MSO/MNO shared core devices 220-1) or an MSO dedicated SMF (e.g., of MSO dedicated core devices 220-2) may be selected to support the default network slice in conjunction with MNO/MSO shared AMF 215-1. According to another example, an MSO/MNO shared UPF (e.g., of MSO/MNO shared core devices 220-1) or an MSO dedicated UPF (e.g., of MSO dedicated core devices 220-2) may be selected to support the default network slice in conjunction with MSO shared AMF 215-2. The selection of at least a portion of the additional core devices may be based on subscriber profile information of MSO UE 205, which may be obtained by an HSS or a UDM, for example. The selection and provisioning of the additional core devices to support the default network slice may be implemented, in part, based on a PDU session establishment procedure according to various network standards (e.g., 3GPP, etc.) or according to a proprietary approach.

Similar to that previously described in relation to MNO gNB 210, according to an exemplary embodiment, MNO/MSO shared AMF 215-1 and MSO dedicated AMF 215-2 may be connected to at least a portion of both MSO/MNO shared core devices 220-1 and MSO dedicated core devices 220-2. For example, MNO/MSO shared AMF 215-1 may include an N11 interface to an MSO/MNO shared SMF and an N8 interface to an MSO/MNO shared UDM and an N11 interface to an MSO dedicated SMF and an N8 interface to an MSO dedicated UDM. According to another exemplary embodiment, MNO/MSO shared AMF 215-1 and MSO dedicated AMF 215-2 may be connected to at least a portion of either MSO/MNO shared core devices 220-1 or MSO dedicated core devices 220-1. The connections and interfaces (e.g., N12, N13, N40, N7, N3, N6, etc.) between the other additional core devices (e.g., AUSF, UDM, HSS, PGW, UPF, CHF, etc.) may be implemented according to the dedicated or shared configurations, as described herein.

Figure 2E:
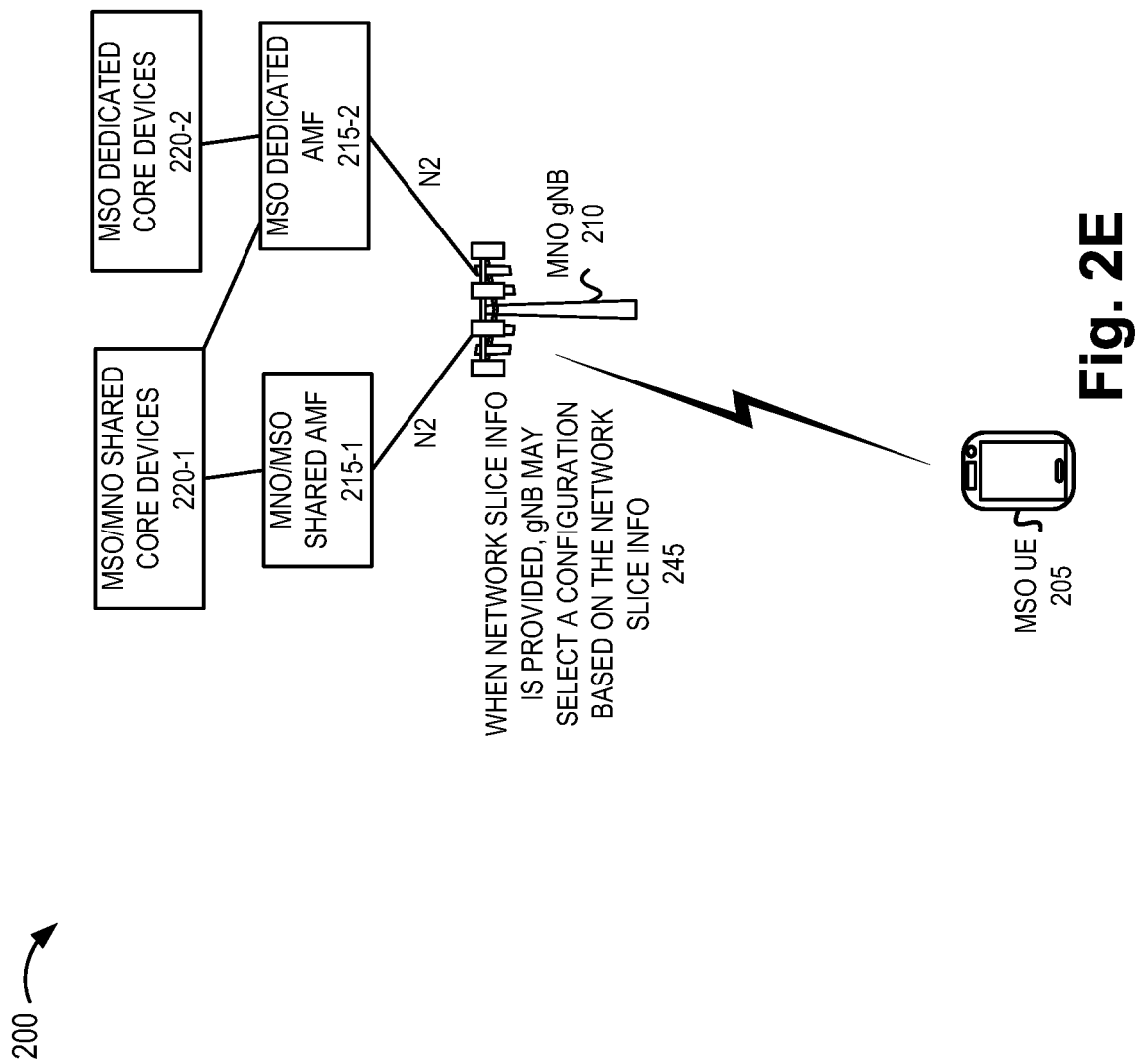

Referring to FIG. 2E, when MNO gNB 210 determines that request 230 does include the network slice information, MNO gNB 210 may select an AMF based on the network slice information 245. For example, MNO gNB 210 may select MNO/MSO shared AMF 215-1 or MSO dedicated AMF 215-2 depending on which AMF may support the requested S-NSSAI(s). MNO gNB 210 may select the AMF based on the other factors, as described herein, in addition to the network slice information. Similarly, MSO/MNO shared core devices 220-1 or MSO dedicated core devices 220-2 may be selected to support the network slice in accordance with a network procedure (e.g., a handover, etc.).

Figure 3A:
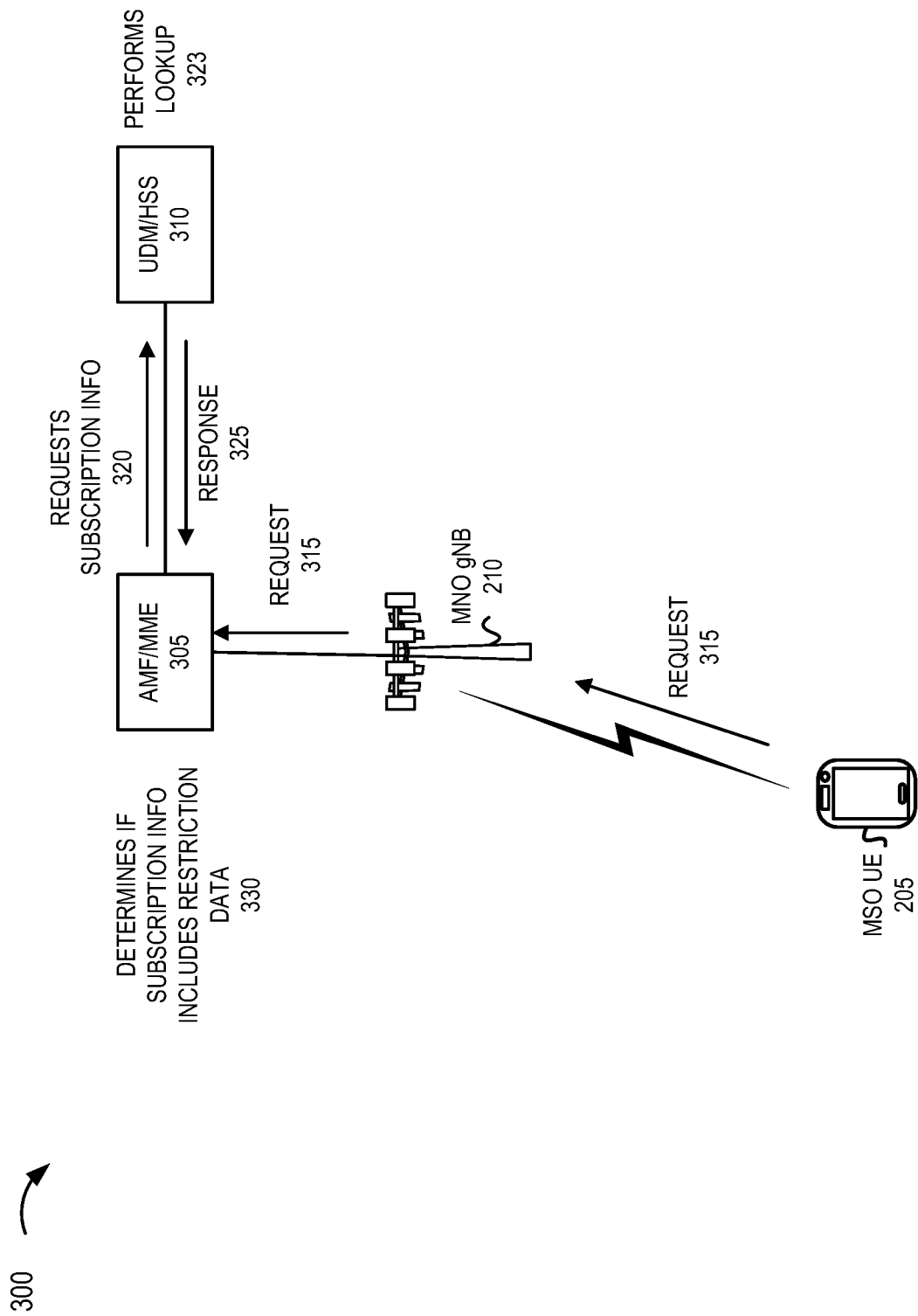
FIGS. 3A and 3B are diagrams illustrating another exemplary process of an exemplary embodiment of the inter-operator mobility service.
Figure 3B:
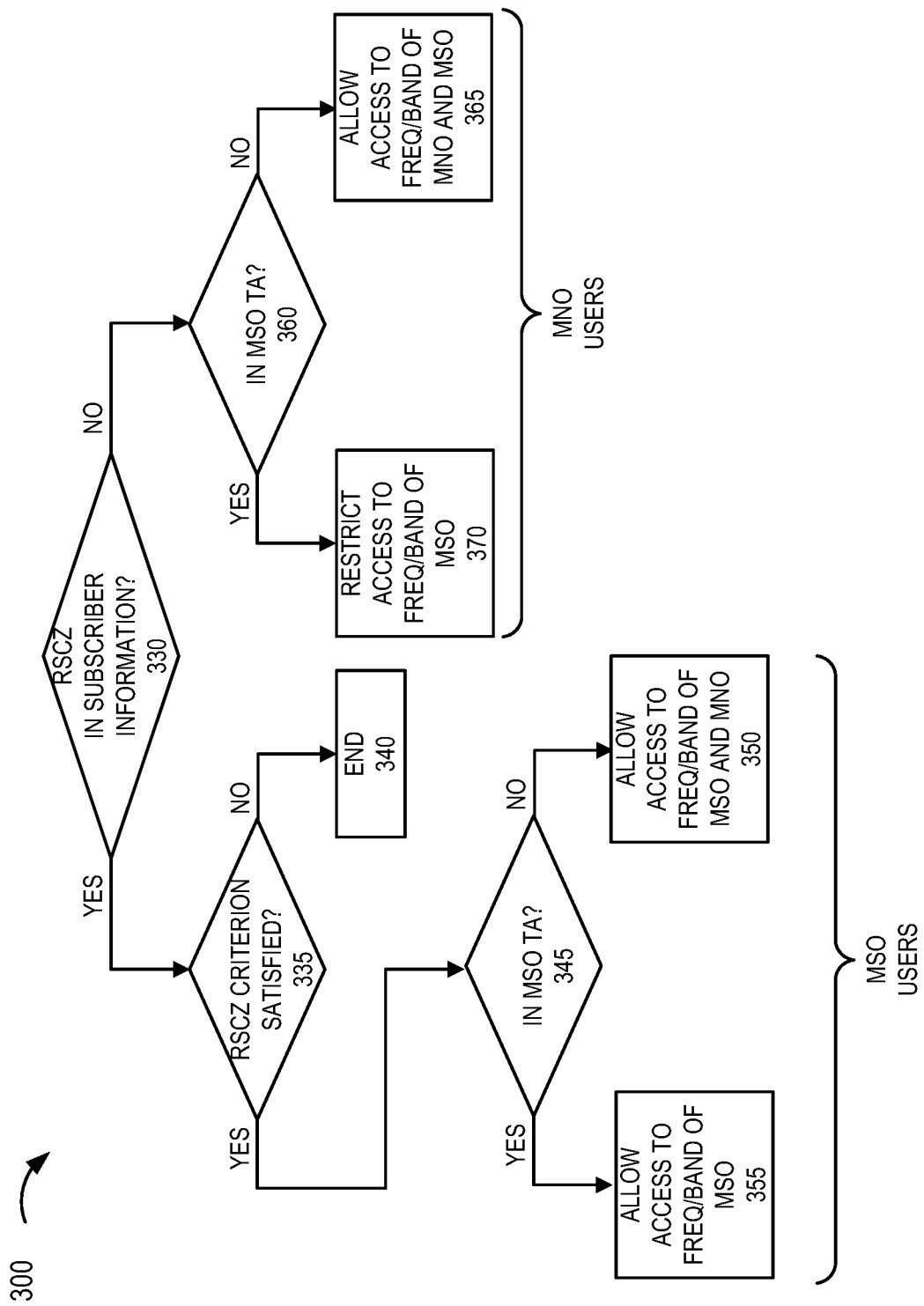

FIGS. 3A and 3B are diagrams illustrating another exemplary process 300 of an exemplary embodiment of the inter-operator mobility service. As illustrated, an environment in which process 300 may be implemented may include an AMF/MME 305, a UDM/HSS 310, MNO gNB 210, and MSO UE 205. AMF/MME 305 and UDM/HSS 310 may each be a dedicated or a shared core device of the MNO network, as described herein.

Referring to FIG. 3A, MSO UE 205 may generate and transmit a request 315 to AMF/MME 305 via MNO gNB 210. For example, request 315 may be implemented as an attach request (e.g., to the MNO core network). Request 315 may include a tracking area identifier (TAI) and/or another type of location information (e.g., registration area code (RAC) of an RA (e.g., a set of tracking areas (TAs), geographical coordinates, etc.). In response to receiving request 315, AMF/MME 305 may obtain subscription information of MSO UE 205 from UDM/HSS 310. For example, as illustrated, AMF/MME 305 may generate and transmit a request for subscription information 320 to UDM/HSS 310. In response to receiving request 320, UDM/HSS 310 may perform a lookup 323. In response to finding the subscription information of MSO UE 205, UDM/HSS 310 may generate and transmit a response 325, which includes the subscription information of MSO UE 205.

In response to receiving response 325, AMF/MME 305 may read the subscription information and determine if the subscription information includes restriction data 330. For example, according to an exemplary embodiment of the inter-operator mobility service, subscription information for at least some or all of MSO users may include a restricted service code zone (RSCZ) parameter and value. As described herein, the RSCZ parameter and value may be used to manage access control relative to RAN devices, as described herein.

Referring to FIG. 3B, an in continuation of FIG. 3A, as illustrated, in block 330, AMF/MME 305 may determine if the subscription information includes restriction data. When the subscription information includes the restriction data, such an RSCZ parameter and value (block 330—YES), AMF/MME 305 may determine whether an RSCZ criterion is satisfied (block 335). For example, AMF/MME 305 may compare the RSCZ value included in the subscription information to a criterion RSCZ value. For example, the criterion RSCZ value may be a single value or a range of RSCZ values. As illustrated, AMF/MME 305 may determine when the RSCZ criterion is satisfied based on a result of the comparison. When the RSCZ criterion is not satisfied (block 335—NO), process 300 may end (block 340). For example, AMF/MME 305 may apply an RSCZ policy that pertains to such MSO users.

When the RSCZ criterion is satisfied (block 335—YES), AMF/MME 305 may determine whether MSO UE 205 is in an MSO TA (block 345). For example, AMF/MME 305 may be configured with location information that correlates to TAIs or other types of geographic area that pertain to an MSO of MSO UE 205. AMF/MME 305 may compare the TAI included in request 315, for example, to TAIs of the MSO of MSO UE 205. Based on a result of the comparison, AMF/MME 305 may determine whether MSO UE 205 is situated in a TA of the MSO or a TA not of the MSO.

When AMF/MME 305 determines that MSO UE 205 is not in an MSO TA (block 345—NO), AMF/MME 305 may allow access to radio frequencies/bands of the MSO and frequencies/frequency bands not of the MSO (e.g., of the MNO, etc.) to MSO UE 205 (block 350). When AMF/MME 305 determines that MSO UE 205 is in an MSO TA (block 345—YES), AMF/MME 305 may allow access to radio frequencies/bands of the MSO to MSO UE 205 (block 355).

According to some exemplary embodiments, as illustrated in FIG. 3B, blocks 335-355 may be applicable to MSO users, while blocks 360-370 may be applicable to MNO users. According to such exemplary embodiments, AMF/MME 305 may, in block 330, determine whether request 315 is from an MSO user or an MNO user instead of determining whether the subscription information includes restriction data, as described herein. According to other exemplary embodiments in which only some MSO users may have restriction data, for example, and/or some or all of MNO users may also have restriction data, as described herein, process 300 may be implemented as previously described.

Referring to FIGS. 3A and 3B, according to another exemplary scenario, assume that an MNO UE transmits request 315. In a manner similar to that previously described, AMF/MME 305 may obtain subscription information from UDM/HSS 310 and determine if the subscription information includes restriction data 330. As illustrated in FIG. 3B, according to this exemplary scenario, AMF/MME 305 may determine that that the subscription information does not restriction data (block 330—NO). For example, the subscription information of the MNO UE may not include an RSZC parameter and value, as described herein. Based on this determination, AMF/MME 305 may determine whether the MNO UE is in a TA of the MSO (block 360). AMF/MME 305 may compare the TAI (or other geographic area data) included in request 315 to a set of TAIs pertaining to the MSO, for example. Based on a result of the comparison, AMF/MME 305 may determine whether the MNO UE is in a TA of the MSO or in a TA of the MNO or other entity.

When AMF/MME 305 determines that the MNO UE is not in the TA of the MSO (block 360—NO), AMF/MME 305 may allow access to radio frequencies/bands without restriction (block 365). For example, the MNO UE may be permitted to access radio frequencies/bands of the MNO and the MSO. When AMF/MME 305 determines that the MNO UE is in the TA of the MSO (block 360—YES), AMF/MME 305 may restrict access to radio frequencies/bands of the MSO (block 370). For example, the MNO UE may not be permitted to use radio frequencies/bands of the MSO.

FIG. 4A is a diagram illustrating yet another exemplary process 400 of an exemplary embodiment of the inter-operator mobility service. As illustrated, MNO gNB 210 may determine 405 that an end device (e.g., MSO UE 205) has a unique identifier. For example, the unique identifier may be implemented as a subscriber profile identifier (SPID) or another type of identifier that identifies MSO UE 205 and/or a user associated with MSO UE 205. The unique identifier may also be an identifier associated with the inter-operator mobility service, as described herein. According to an exemplary embodiment, MNO gNB 210 may make this determination based on subscription information of MSO UE 205. For example, according to an exemplary embodiment of the inter-operator mobility service, unique SPIDs may be added to subscription information for MSO users or subscribers. The subscription information may be stored at an HSS, a UDM, or similar network device. Based on determining that MSO UE 205 is an MSO subscriber/user, MNO gNB 210 may generate and transmit 410 a request that includes data indicating radio frequencies/bands of an MSO associated with MSO UE 205. The data may also include data indicating radio frequencies/bands of an MNO associated with MNO gNB 210, which may be different from those of the MSO. For example, request 415 may be implemented as a measurement report request or another type of request that may pertain to a cell selection or a cell reselection procedure to be performed by MSO UE 205.

As further illustrated, in response to receiving request 415, MSO UE 205 may perform a procedure based on the request 420. For example, MSO UE 205 may scan and measure frequencies/bands of the MSO based on the data (e.g., a measurement object, an AVP, etc.) included in request 415. In this way, MSO UE 205 may scan and measure for cells/channels, which may be served by MNO gNB 210, and associated with the MSO. MSO UE 205 may generate and transmit 425 a response. For example, response 430 may include measurements of the cells or channels measured. Although not illustrated, MNO gNB 210 may evaluate response 430 and select a radio frequency/band to which MSO UE 205 may use to attach to MNO gNB 210 or another RAN device of access network 105 (e.g., MNO RAN).

Figure 4B:
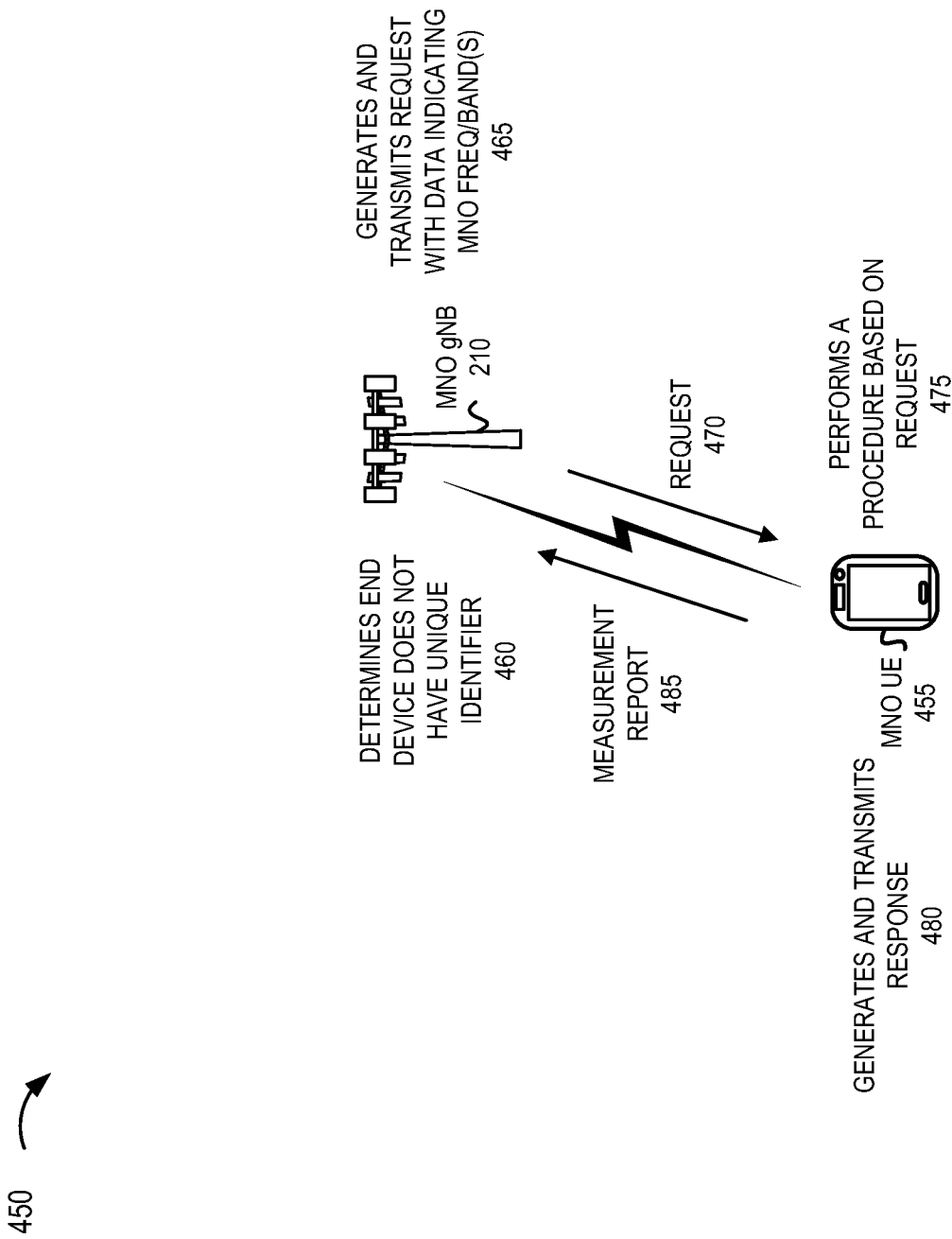

FIG. 4B is a diagram illustrating still another exemplary process 450 of an exemplary embodiment of the inter-operator mobility service. According to this exemplary scenario, an MNO UE 455 is illustrated. For example, MNO UE 455 may be associated with an MNO of MNO gNB 210. As illustrated, MNO gNB 210 may determine 460 that an end device (e.g., MNO UE 455) does not have a unique identifier. For example, as previously described, the unique identifier may pertain to the inter-operator mobility service, as described herein. According to an exemplary embodiment, MNO gNB 210 may make this determination based on subscription information of MNO UE 455. Based on determining that MNO UE 455 is not an MSO subscriber/user, MNO gNB 210 may generate and transmit 465 a request that includes data indicating radio frequencies/bands, which may exclude the radio frequencies/bands of the MSO to which the inter-operator mobility service pertains. Request 470 may be implemented as a measurement report request or another type of request that may pertain to a cell selection or a cell reselection procedure to be performed by MNO UE 455.

As further illustrated, in response to receiving request 470, MNO UE 455 may perform a procedure based on the request 475. For example, MNO UE 455 may scan and measure frequencies/bands of the MNO based on the data (e.g., a measurement object, an AVP, etc.) included in request 470. In this way, MNO UE 455 may scan and measure for cells/channels, which may be served by MNO gNB 210 or another access device 107 of an MNO access network 105 but not access device 107 of an MSO access network 105. Alternatively, MNO UE 455 may not measure and scan radio frequencies/bands/channels of an MSO gNB, for example. MNO UE 455 may generate and transmit 480 a response. For example, response 485 may include measurements of the cells or channels measured. Although not illustrated, MNO gNB 210 may evaluate response 485 and select a radio frequency/band to which MNO may use to attach to MNO gNB 210 or another RAN device of access network 105 (e.g., MNO access network 105).

Figure 5A:
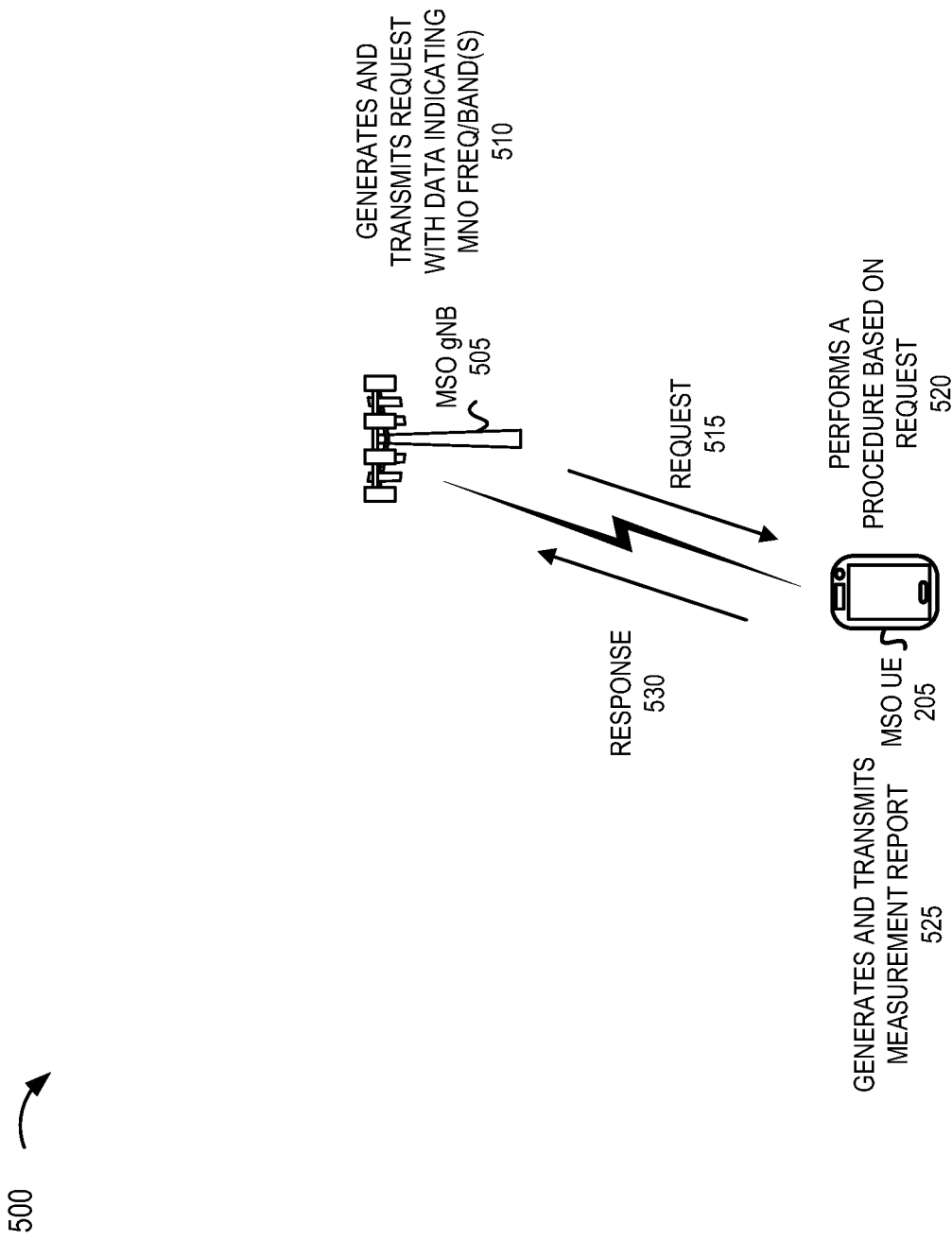
FIGS. 5A and 5B are diagrams illustrating still another exemplary process of an exemplary embodiment of the inter-operator mobility service.
Figure 5B:
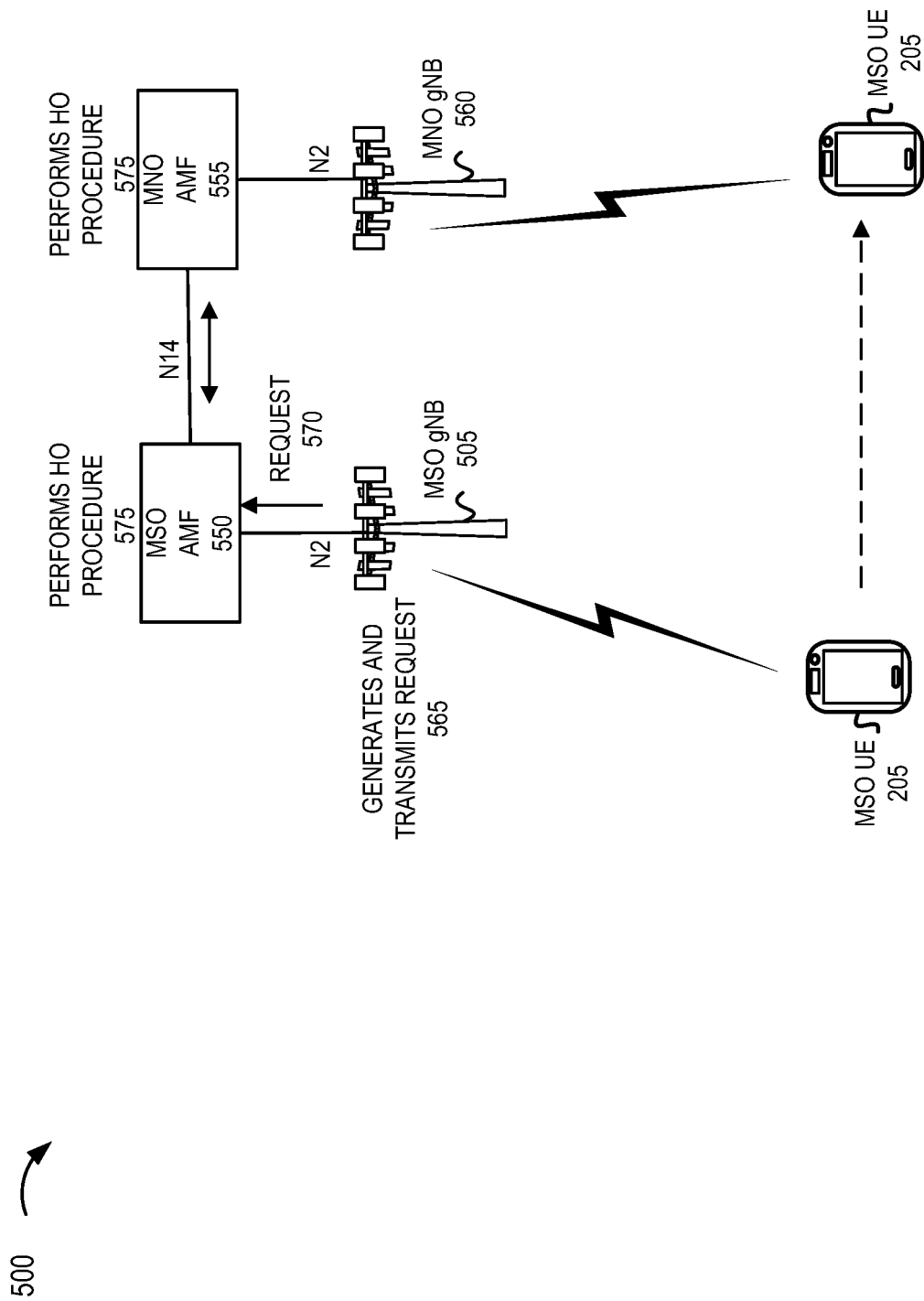

FIGS. 5A and 5B are diagrams illustrating still another exemplary process 500 of an exemplary embodiment of the inter-operator mobility service. According to this exemplary scenario, referring to FIG. 5A, assume an MSO gNB 505 may be providing wireless access to MSO UE 205. MSO gNB 505 may be implemented as access device 107 which is associated with an MSO access network, for example. According to an exemplary embodiment, MSO UE 205 may be configured with public land mobile network (PLMN) identifiers associated with an MNO. For example, the configuration may be implemented on a subscriber identity module (SIM), an eSIM, or the like. Alternatively, for example, the configuration may be implemented based on communication with access network 105 and/or core network 120. MSO UE 205 may also be configured or capable of scanning and measuring radio frequencies/bands associated with the MNO. According to an exemplary embodiment of the inter-operator mobility service, when MSO UE 205 may be out of a coverage area associated with a radio frequency/band of the MSO, MSO UE 205 may attach to an MNO gNB, for example, and also be provisioned a network slice, which may include a shared AMF or a dedicated AMF, as well as other core devices of an MNO core network, as previously described herein. In this regard, the inter-operator mobility service may support an inter-PLMN handover between the MSO and the MNO. For example, the inter-PLMN handover may relate to a 5G SA MSO network to a 5G SA network slice of the MNO network.

Referring to FIG. 5A, MSO gNB 505 may generate and transmit 510 a request that includes data indicating radio frequencies/bands of the MNO. Request 515 may be implemented as a measurement report request or another type of request that may pertain to a cell selection or a cell reselection procedure or a handover procedure to be performed by MSO UE 205. As further illustrated, in response to receiving request 515, MSO UE 205 may perform a procedure based on the request 515. For example, MSO UE 205 may scan and measure frequencies/bands of the MNO based on the data (e.g., a measurement object, an AVP, etc.) included in request 515. In this way, MSO UE 205 may scan and measure for cells/channels, which may be served by an MNO gNB or another access device 107 of an MNO access network 105. MSO UE 205 may generate and transmit 525 a response. For example, response 525 may include measurements of the cells or channels measured. Although not illustrated, MSO gNB 505 may evaluate response 530 and select a radio frequency/band to which MSO UE 205 may use to attach to the MNO gNB or another RAN device of access network 105 (e.g., MNO access network 105) in relation to a handover procedure.

Referring to FIG. 5B, according to an exemplary embodiment, MSO gNB 505 may generate and transmit 565 a request to an MSO AMF 550. As further illustrated, an exemplary environment may include an MNO AMF 555 and an MNO gNB 560 that may support the handover between the MSO and MNO networks. Request 570 may include a request for a handover. Request 570 may include various types of data to enable the handover, such as an MNO PLMN identifier, a globally unique AMF identifier (GUATI) (e.g., of MSO AMF 550), and source container information (e.g., a target gNB identifier, etc.). Request 570 may include an identifier of MNO gNB 560. In response to receiving request 570, MSO AMF 550 may determine whether to perform a handover procedure based on request 570, for example.

MSO AMF 550 may perform a handover procedure 575 in collaboration with MNO AMF 555. According to an exemplary embodiment, the handover procedure may result in provisioning a network slice according to an exemplary embodiment of the inter-operator mobility service, as described herein. For example, an MNO network slice may be established based on information associated with an MSO network slice. Alternatively, for example, when there was not a pre-existing MSO network slice (e.g., via MSO gNB 505), MNO AMF 555 may or may not establish an MNO network slice. As an example, a default MNO network slice may be established.

FIG. 6 is a diagram illustrating exemplary components of a device 600 that may be included in one or more of the devices described herein. For example, device 600 may correspond to access device 107, external device 117, core device 122, end device 130, MSO UE 205, MNO gNB 210, MNO/MSO shared AMF 215-1, MSO dedicated AMF 215-2, MSO/MNO shared core devices 220-1, MSO dedicated core devices 220-2, AMF/MME 305, and/or other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, learning, model-based, etc.

Memory/storage 615 includes one or multiple memories and/or one or multiple other types of storage mediums. For example, memory/storage 615 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to access device 107, software 620 may include an application that, when executed by processor 610, provides a function and/or a process of inter-operator mobility service, as described herein. Additionally, with reference to end device 130, software 620 may include an application that, when executed by processor 610, provides a function and/or a process of inter-operator mobility service, as described herein. Also, with reference to core devices 122 (e.g., AMF, MME, etc.), software 620 may include an application that, when executed by processor 610, provides a function and/or a process of inter-operator mobility service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service-based interface, or a reference interface, for example. As previously mentioned, communication interface 625 may support the inter-operator mobility service, as described herein.

Input 630 permits an input into device 600. For example, input 630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a function or a process described herein. Alternatively, for example, according to other implementations, device 600 performs a function or a process described herein based on the execution of hardware (processor 610, etc.).

Figure 7:
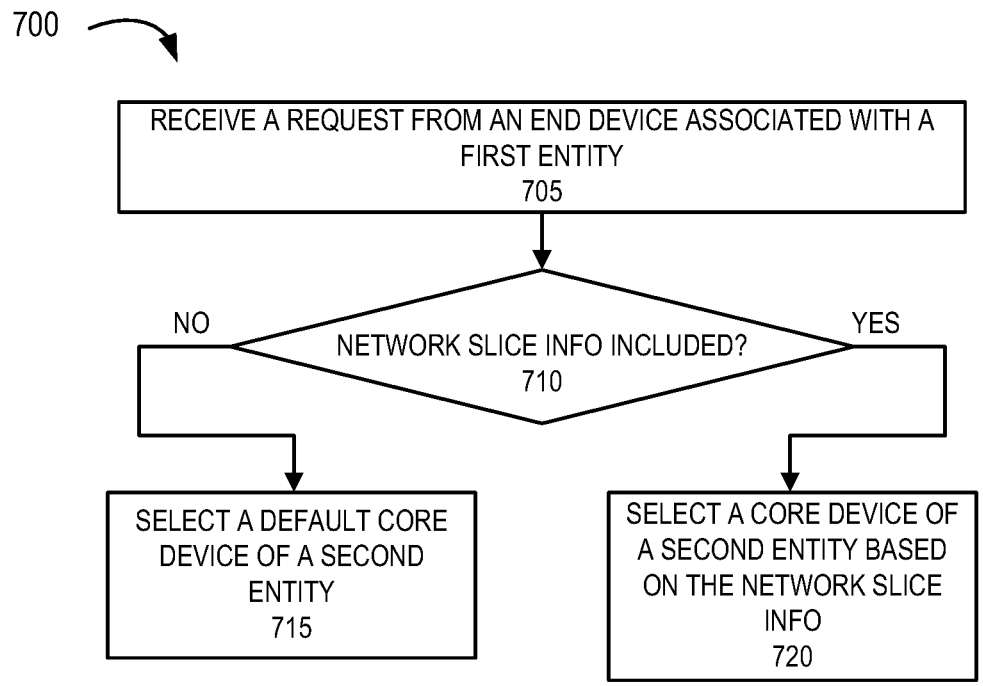
FIG. 7 is a flow diagram illustrating an exemplary process of an exemplary embodiment of an inter-operator mobility service.

FIG. 7 is a flow diagram illustrating an exemplary process 700 of an exemplary embodiment of inter-operator mobility service. According to an exemplary embodiment, access device 107 may perform a step of process 700. According to an exemplary implementation, processor 610 executes software 620 to perform the step of process 700, as described herein. Alternatively, the step may be performed by execution of only hardware.

In block 705, access device 107 may receive a request from an end device associated with a first entity. For example, an MNO access device 107 may receive a PDU session establishment request from an MSO end device 130.

In block 710, access device 107 may determine whether the request includes network slice information. For example, the MNO access device 107 may read the request and determine whether the request includes an S-NSSAI, NSSAI, or other type of information indicating a network slice.

When access device 107 determines that the request does not include the network slice information (block 710—NO), access device 107 may select a default core device of a second entity (block 715). For example, the MNO access device 107 may select a dedicated AMF or a shared AMF of the MNO, as described herein. Additionally, for example, other core devices 122 of the MNO may be selected, which may be dedicated or shared. A network slice may be established in the MNO network that supports the PDU session requested by the MSO end device 130, as described herein.

When access device 107 determines that the request does include the network slice information (block 710—YES), access device 107 may select a core device of the second entity based on the network slice information (block 720). For example, the MNO access device 107 may select an AMF that is configured to support the network slice. Additionally, for example, other core devices 122 of the MNO may be selected based on the network slice information, as described herein. A network slice may be established in the MNO network that supports the PDU session requested by the MSO end device 130, as described herein.

FIG. 7 illustrates an exemplary embodiment of a process of inter-operator mobility service, according to other exemplary embodiments, the inter-operator mobility service may perform additional operations, fewer operations, and/or different operations than those illustrated and described.

Figure 8:
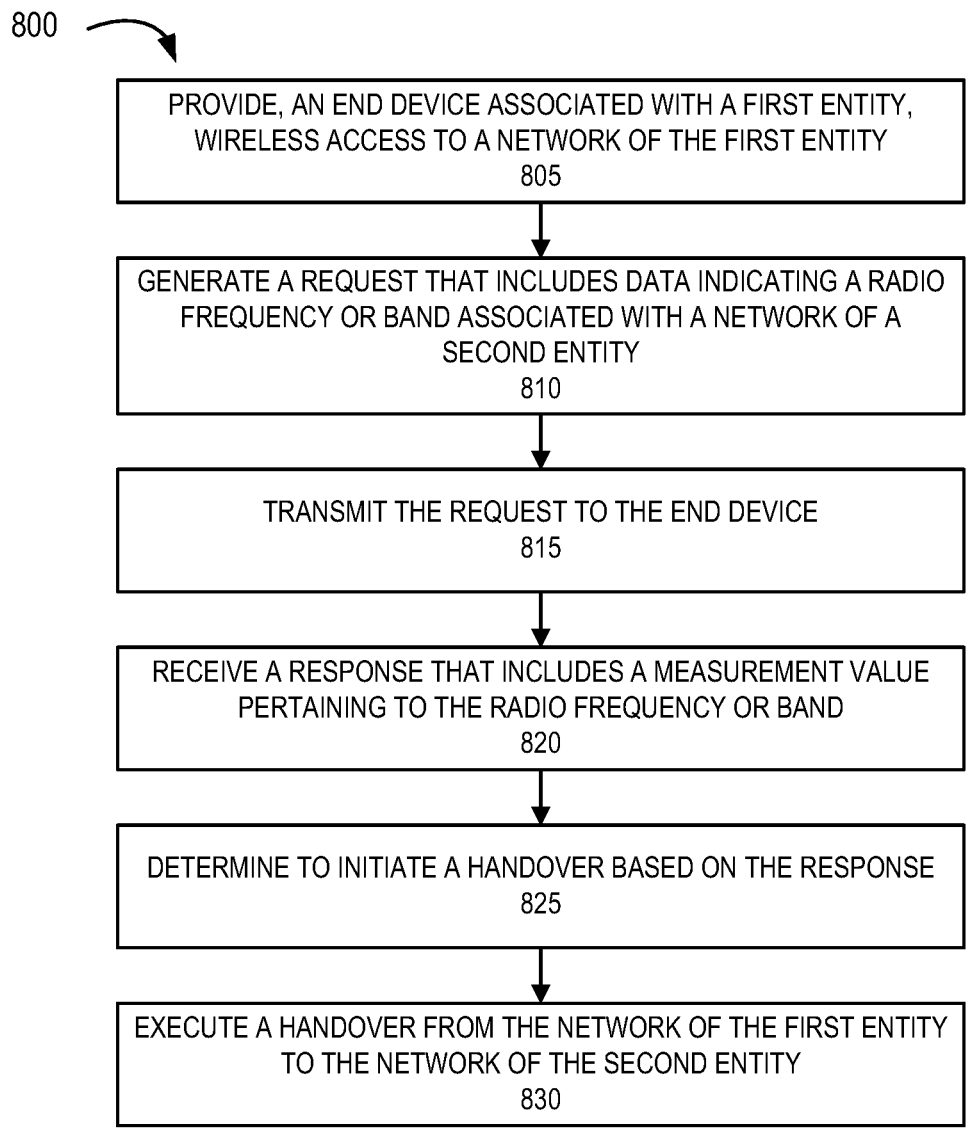
FIG. 8 is a flow diagram illustrating another exemplary process of an exemplary embodiment of an inter-operator mobility service.

FIG. 8 is a flow diagram illustrating an exemplary process 800 of an exemplary embodiment of inter-operator mobility service. According to an exemplary embodiment, access device 107 may perform a step of process 800. According to an exemplary implementation, processor 610 executes software 620 to perform the step of process 800, as described herein. Alternatively, the step may be performed by execution of only hardware.

In block 805, access device 107 may provide wireless access to an end device. For example, an MSO access device 107 may provide an MSO end device 130 wireless access to an MSO network. The MSO end device 130 may be configured and/or capable of scanning, measuring, and attaching to an MNO network via an MNO radio frequency/band, as described herein.

In block 810, access device 107 may generate a request that includes data indicating a radio frequency or band. For example, the MSO access device 107 may generate a request that includes data indicating the MNO radio frequency/band. The request may be a measurement request.

In block 815, access device 107 may transmit the request. For example, the MSO access device 107 may transmit the request to the MSO end device 130. As described herein, the MSO end device 130 may scan and measure a signal (e.g., a reference signal) associated with the MNO radio frequency/band, and transmit a response to the request to the MSO access device 107.

In block 820, access device 107 may receive a response to the request. For example, the MSO access device 107 may receive a measurement report from the MSO end device 130. The measurement report may include a measurement value pertaining to the MNO radio frequency/band.

In block 825, access device 107 may determine whether to initiate a handover based on the response. For example, the MSO access device 107 may determine whether to initiate an inter-PLMN handover between the MSO network and the MNO network, as described herein, based on the measurement value. For example, the MSO access device 107 may determine that the MSO end device 130 can no longer be served (by the MSO access device 107), and that an MNO access device 107 associated with the MNO radio frequency/band may provide wireless access.

In block 830, access device 107 may execute the handover from the network of the first entity to the network of the second entity. For example, the MSO access device 107 may transmit a handover request to an MSO AMF, as described herein. The MSO AMF may facilitate the handover with the MNO network based on the handover request, as described herein. According to an exemplary implementation, the MSO end device 130 may be attached to the MSO network in a 5G SA configuration and the handover includes the MSO end device 130 attaching to the MNO network and a network slice (e.g., a 5G SA network slice) of the MNO network. According to other examples, the handover may not include a network slice in the MNO network or may include a network slice in an NSA configuration in the MNO network.

FIG. 8 illustrates an exemplary embodiment of a process of inter-operator mobility service, according to other exemplary embodiments, the inter-operator mobility service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 7 and 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a network device of radio access network of a first entity, a first request from an end device associated with a second entity;
determining, by the network device, that the first request does not include network slice information;
selecting, by the network device based on the determining, a core device of a core network of the first entity, wherein the core device is a shared core device allocated to users associated with the first entity and users associated with the second entity or a dedicated core device allocated to the users associated with the second entity; and
establishing, by the network device, a network connection with the core device that pertains to the end device.

2. The method of claim 1, wherein the core device includes at least one of mobility management entity or an access and mobility management function device.

3. The method of claim 1, wherein the first request includes a packet data unit (PDU) session establishment request.

4. The method of claim 1, further comprising:
provisioning other core devices of the core network of the first entity based on the determining, wherein the other core devices include shared core devices allocated to the users associated with the first entity and the users associated with the second entity, or dedicated core devices allocated to only the users associated with the second entity; and
providing an application service to the end device via the network device and one or more of the other core devices.

5. The method of claim 1, further comprising:
generating, by the network device, a second request that includes data indicating one or more radio frequencies or bands associated with the second entity;
transmitting, by the network device, the second request to the end device; and
receiving, by the network device from the end device responsive to the second request, a response that includes one or more measurement values pertaining to the one or more radio frequencies or bands.

6. The method of claim 5, further comprising:
determining, by the network device, that the end device is associated with the first entity based on an identifier that identifies the end device; and wherein the generating further comprises:
generating, by the network device based on the determining that the end device is associated with the first entity, the second request.

7. The method of claim 1, wherein the selecting further comprises:
selecting, by the network device as a binary choice, between the shared core device or the dedicated core device based on at least one of data included in the first request, a location of the end device, or a radio frequency or band via which the end device is connected to the network device.

8. The method of claim 1, wherein the network device includes a next generation Node B or a distributed unit (DU) and a radio unit (RU) device.

9. A network device comprising:
a processor configured to:
receive a first request from an end device associated with a second entity, wherein the network device is of a radio access network of a first entity;
determine that the first request does not include network slice information;
select, based on the determination, a core device of a core network of the first entity, wherein the core device is a shared core device allocated to users associated with the first entity and users associated with the second entity or a dedicated core device allocated to the users associated with the second entity; and
establish a network connection with the core device that pertains to the end device.

10. The network device of claim 9, wherein the core device includes at least one of mobility management entity or an access and mobility management function device.

11. The network device of claim 9, wherein the first request includes a packet data unit (PDU) session establishment request.

12. The network device of claim 9, wherein the processor is further configured to:
generate a second request that includes data indicating one or more radio frequencies or bands associated with the second entity;
transmit the second request to the end device; and
receive, from the end device responsive to the second request, a response that includes one or more measurement values pertaining to the one or more radio frequencies or bands.

13. The network device of claim 12, wherein the processor is further configured to:
determine that the end device is associated with the first entity based on an identifier that identifies the end device; and wherein the processor is further configured to:
generate, based on the determination that the end device is associated with the first entity, the second request.

14. The network device of claim 9, wherein the processor is further configured to:
select, as a binary choice, between the shared core device or the dedicated core device based on at least one of data included in the first request, a location of the end device, or a radio frequency or band via which the end device is connected to the network device.

15. The network device of claim 9, wherein the processor is further configured to:
provide an application service to the end device based on a network slice provisioned for the end device based on the first request, and wherein the network slice includes one or more other core devices of the core network of the first entity, and wherein the one or more other core devices include one or more shared core devices allocated to the users associated with the first entity and the users associated with the second entity, or one or more dedicated core devices allocated to only the users associated with the second entity.

16. The network device of claim 9, wherein the network device includes a next generation Node B, or a distributed unit (DU) and a radio unit (RU) device.

17. A non-transitory computer-readable storage medium storing instructions executable by a processor of a network device of a radio access network of a first entity, wherein the instructions are configured to:

receive a first request from an end device associated with a second entity;

determine that the first request does not include network slice information;

select, based on the determination, a core device of a core network of the first entity, wherein the core device is a shared core device allocated to users associated with the first entity and users associated with the second entity or a dedicated core device allocated to the users associated with the second entity; and establish a network connection with the core device that pertains to the end device.

18. The non-transitory computer-readable storage medium of claim 17, wherein the core device includes at least one of mobility management entity or an access and mobility management function device.

19. The non-transitory computer-readable storage medium of claim 17, wherein the first request includes a packet data unit (PDU) session establishment request.

20. The non-transitory computer-readable storage medium of claim 17, wherein the instructions further comprise instructions configured to:

generate a second request that includes data indicating one or more radio frequencies or bands associated with the second entity;

transmit the second request to the end device; and receive, from the end device responsive to the second request, a response that includes one or more measurement values pertaining to the one or more radio frequencies or bands.

* * * * *